US006988125B2

(12) United States Patent
Elnozahy et al.

(10) Patent No.: US 6,988,125 B2
(45) Date of Patent: Jan. 17, 2006

(54) SERVICING CLIENT REQUESTS IN A NETWORK ATTACHED STORAGE (NAS)-BASED NETWORK INCLUDING REPLICATING A CLIENT-SERVER PROTOCOL IN A PACKET GENERATED BY THE NAS DEVICE

(75) Inventors: Elmootazbellah Nabil Elnozahy, Austin, TX (US); Michael David Kistler, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 798 days.

(21) Appl. No.: 09/915,435

(22) Filed: Jul. 26, 2001

(65) Prior Publication Data

US 2003/0033383 A1  Feb. 13, 2003

(51) Int. Cl.
G06F 13/00  (2006.01)
(52) U.S. Cl. .................................................. 709/203
(58) Field of Classification Search ............... 709/200, 709/201, 203, 212, 213, 216, 217, 219; 711/100, 711/117, 118, 216, 130, 138, 141, 142
See application file for complete search history.

(56) References Cited

U.S. PATENT DOCUMENTS 6,138,141 A * 10/2000 DeSimone et al. ......... 709/203

* cited by examiner

Primary Examiner—Robert B. Harrell
(74) Attorney, Agent, or Firm—Joseph P. Lally; Casimer K. Salys

(57) ABSTRACT

A method and system for responding to a client request for information from a service device in a data processing network. Initially, the server receives the information request from the client and determines that the requested information is not in the server's cache. The server then generates a storage request and sends the storage request to a network attached storage device. The storage device retrieves the requested information and generates a set of packets containing the requested information. The storage device then sending the generated packets simultaneously to the client to satisfy the client request and to the server to refresh the server cache. The storage request may include protocol information corresponding to the client-server connection that the storage device uses to replicate the client-server protocol stack in the generated packet. Sending the generated packet may comprise including a multicast address in the packet.

20 Claims, 3 Drawing Sheets

SERVICING CLIENT REQUESTS IN A NETWORK ATTACHED STORAGE (NAS)-BASED NETWORK INCLUDING REPLICATING A CLIENT-SERVER PROTOCOL IN A PACKET GENERATED BY THE NAS DEVICE

BACKGROUND

1. Field of the Present Invention

The present invention generally relates to the field of data processing networks. More particularly, the invention relates to a network and method for improving response time in server networks that use Network Attached Storage (NAS).

2. History of Related Art

In the field of network computing, networked storage including network attached storage (NAS) devices are well known. A NAS device is connected to a network, such as an Ethernet local area network (LAN), in the same manner as network servers and other computing devices are connected. Each NAS device is associated with a unique Internet Protocol (IP) address on the network. IP provides the basic communication protocol for a wide variety of computer networks including the Internet. IP is more fully documented in the Internet Engineering Task Force (IETF) Request for Comment (RFC) 791, which is incorporated by reference herein. Servers and NAS devices may use the Transmission Control Protocol (TCP) to communicate among themselves. The TCP protocol is usually layered on top of the IP protocol. Independently, clients and servers also may use the TCP protocol to communicate. The TCP protocol is more fully documented in Internet Engineering Task Force (IETF) Request for Comment (RFC) 793.

As a network entity, the NAS device is equally accessible from any computing device on the network thereby greatly increasing the ability to scale and optimize the storage needs of the network. Specifically, NAS devices allow the decomposition of server networks to storage-only components and diskless server components. This decomposition offers tremendous advantages to system administrators, including ease of deployment, system management, and enhanced scalability and reliability.

The flexibility offered by networked storage devices has changed the manner in which server networks are implemented. For instance, it is increasingly common to encounter web-based services being handled by one or more server devices, possibly diskless, that use a common set of networked storage boxes including NAS devices.

The widespread use of NAS devices can result, unfortunately, in additional and unwanted network traffic. Because NAS devices reside on the same network as the network servers, storage traffic (i.e., traffic between a server and a NAS device) travels over the same network and therefore competes with client-server traffic (including client requests to servers for files and the corresponding responses). The storage traffic on the server network reduces the bandwidth available for client-server traffic thereby potentially limiting overall network response and performance.

FIG. 1 presents a conceptual illustration of the process by which a client request for a file (or other form of data) may be serviced. Initially, a client 102 generates a request for data from a particular server 110. The request is transmitted to server 110 as a set of one or more network datagrams or packets 121 according to the TCP/IP protocol. The first packet 121 includes a destination address field containing the address of server 110 and a source address field containing the address of client 102. Both of the addresses are typically in IP compliant format.

For a variety of reasons, server 110 may not have a copy of the requested file available locally either in its system (volatile) memory or on disk (non-volatile) storage (if a local disk exists). When this occurs, server 110 may retrieve the file from a NAS device 112 by generating a second packet 122 having server 110 as the source address and NAS device 112 as the destination address. Packet 122 conforms to the TCP protocol. NAS device 112 will receive second packet 122, retrieve the requested file, and respond to the request from server 110 with a third packet 123 having NAS device 112 as the source address and server 110 as the destination address. Packet 123 also conforms to the TCP protocol. After receiving the requested files from NAS device 112, server 110 may then finally respond to the client request by generating a fourth packet 124 according to the TCP protocol, having server 110 as the source and client 102 as the destination and containing the originally requested file data.

It will be appreciated by those in the field of networked computing that the process described above undesirably results in extra network traffic. The four packets that are required to service the request must all travel over the server network. In addition, the generation and reception of each packet requires potentially significant network processing on the part of their respective senders and receivers. Each packet must be formatted according to the TCP/IP network protocol. Each server and client on the network contains code that formats requests and responses for travel over the network. Each packet sent over the network must descend a protocol stack at the source and ascend a stack at the destination.

In the example described above, a single client request resulted in the transmission of four sets of packets, each of which must traverse a protocol stack twice. In a traditional network where NAS boxes are not used (the disks reside locally at the server), only two such packets would have been necessary. It should be apparent that a potentially significant amount of network processing has occurred in satisfying the client request in a NAS-based environment. It would be beneficial to employ a server network and method that reduced the amount of network traffic and network processing that accompanies a client request to a server network employing networked storage. It would be further desirable if the implemented solution complied, to the extent possible, with existing protocols and networks.

SUMMARY OF THE INVENTION

The problems identified above are in large part addressed by a network and method for responding to client requests. The network includes a server network or server cluster that includes one or more server devices and one or more NAS devices on a local area network. The local area network includes the ability to perform multicasting, which can transfer the network packets unreliably to one or more recipients. Having a broadcast network such as an Ethernet cable or a Token ring cable can provide this ability. Alternatively, a local area network switch can forward a packet from its sender to several recipients in a switched network configuration. The multicasting occurs at a level lower than the IP layer, e.g., at the Ethernet layer, or the link level, or layer 2 in the Open System Internetworking (OSI) reference model and is not required to be reliable.

The local area network may be connected to a wider network, such as the Internet, through a suitable gateway (usually different from the local area network switch). A client issues a request to a server in the server network, either by sending a request over the local area network if the client resides on the same network, or through the gateway if the client accesses the server across the wide area network. Upon receiving the request, the server determines if the data is available in the local cache. If the data is locally available, the server responds with the required files. If the data is not available, the server must retrieve all or a portion of the requested data from a NAS device.

The server may generate a request to the NAS device that identifies the requested file or data. The request also includes the client's IP address and sufficient information to recreate the protocol stack that belongs to the connection between the client and server. When the NAS device receives the request from the server, it retrieves the requested data as commonly done in the art. It also replicates the protocol stack that belongs to the connection between the client and server. It then generates a response using TCP/IP packets containing the requested file. The packets belonging to the response use the IP address of the server as a sender, and use a special multicast address at the data link layer. If the client resides on the local area network, then the data-link multicast address is designed to reach the client and server. Otherwise, if the client accesses the server through a wide area network, then the multicast address is designed to reach the server and the gateway that connects the local area network to the rest of the network. In the latter case, the gateway processes the packets in the conventional way and forwards them to the client. In both cases, the client receives the data, and the source address that it perceives is that of the server, not the NAS device (the client is not aware of the existence of the NAS device).

In either case, the server receives the packets that were sent from the NAS device to the client with a high probability of success. This will help the server catch the data going to the client and insert it in the local cache. This way, future requests of the data will be served out of the server's cache without having to involve the NAS device. Further requests by the client for closing the connection are handled by the server, but if the client requests the retransmission of some TCP packets, the server forwards such requests to the NAS device which retransmits the required TCP packets in the same manner as described previously. The NAS device uses a timeout mechanism to reclaim the resources used for the replica of the protocol stack that belongs to the connection between the client and server. The time-out should be chosen to exceed the time out for the connection between the server and clients by a safe margin, as engineering considerations may require.

There is no guarantee that the server will perceive the response of the NAS device to the client. This could happen because of network failures, buffer overflow at the receiver, or if the packets are corrupted. There is no harm that could occur in this case. The only disadvantage is that the server cannot place the response in its local cache, and thus future requests for this data item will be handled as described above.

The advantage of this method is that it reduces the latency of generating the response to the client. In a conventional system, the response has to traverse the protocol stack twice at the server before the actual response is generated. Under the current invention, the response is generated from the NAS device, carrying the IP address of the server as a sender, and using probabilistic multicasting to reduce the overhead of refreshing the server's cache. This reduces network overhead associated with the use of NAS devices.

BRIEF DESCRIPTION OF THE DRAWINGS

Other objects and advantages of the invention will become apparent upon reading the following detailed description and upon reference to the accompanying drawings in which.

Figure 1:
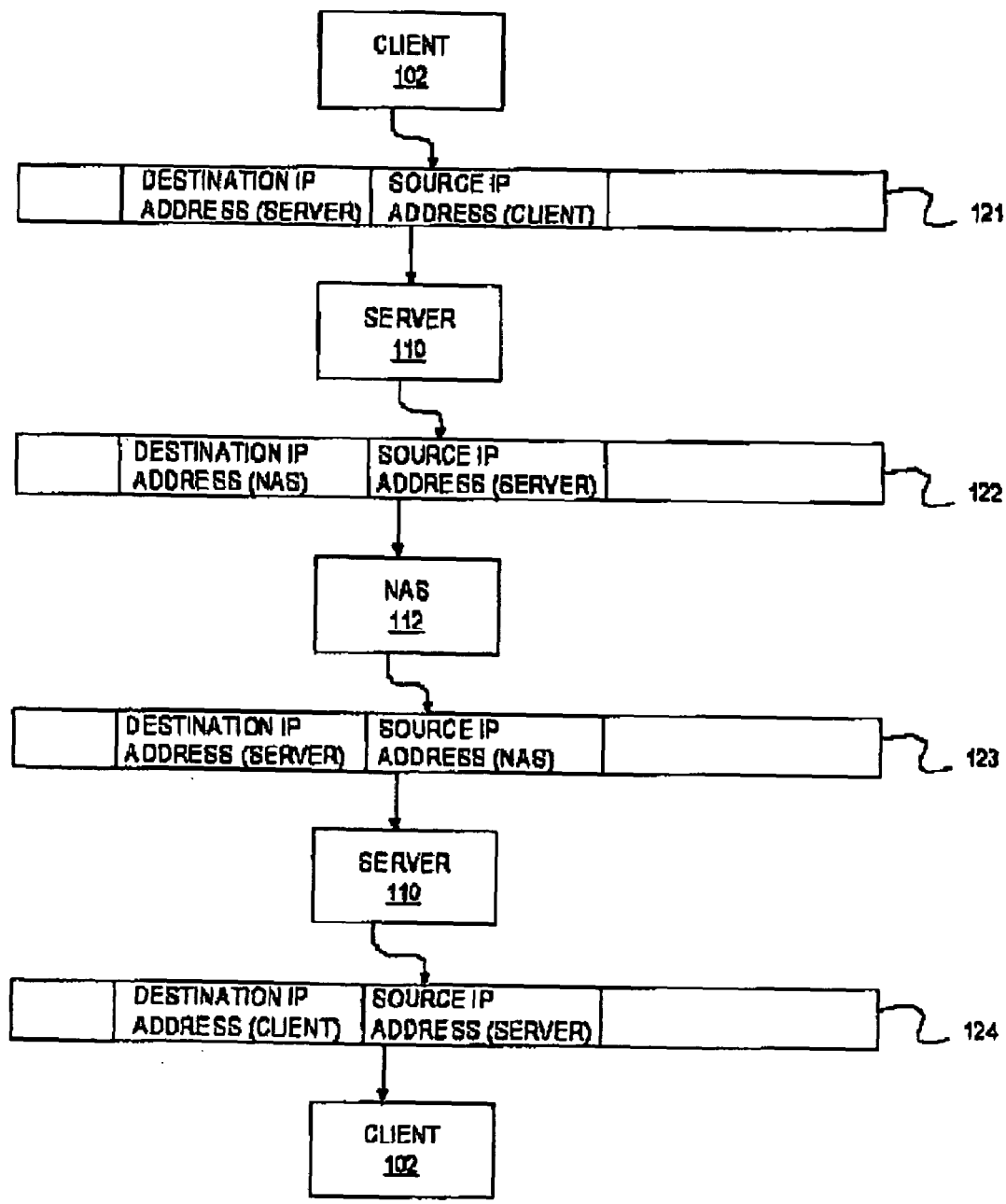
FIG. 1 is a conceptual representation a client-server transaction according to the prior art.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Figure 2:
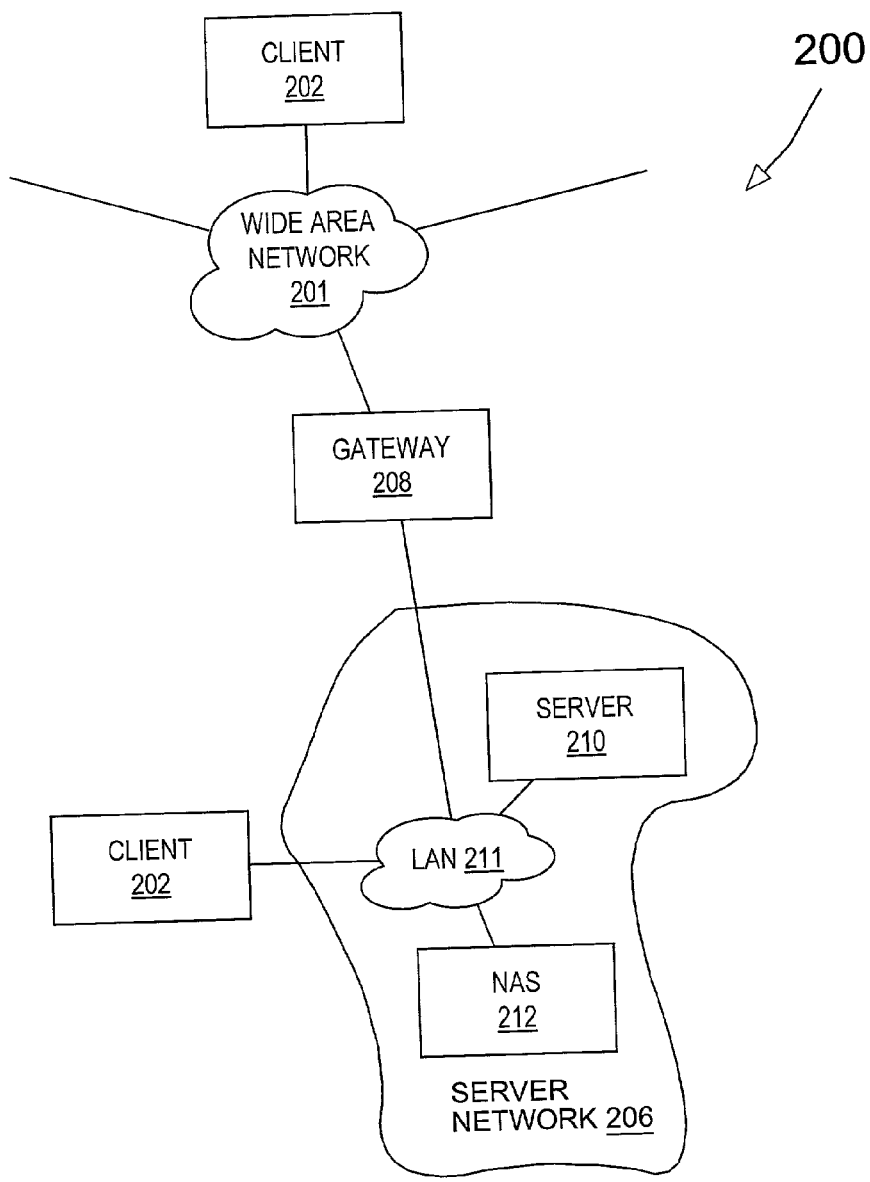
FIG. 2 is a block diagram of selected elements of a data processing network according to one embodiment of the present invention.

Turning now to the drawings, FIG. 2 is a block diagram illustrating selected features of a data processing network 200 according to one embodiment of the present invention. In the depicted embodiment, a server network 206 includes one or more server devices 210 and a NAS device 212 connected via a local area network (LAN) represented by reference numeral 211. LAN 211 may be implemented with a shared medium such as in an Ethernet or token ring network, or as a switched (point-to-point) network in which the server(s) 210 and NAS device(s) are connected to a switch capable of providing a dedicated path between pairs of devices on the network. In either embodiment, the selected implementation of LAN 211 includes multicasting capability in which packets are transmitted to multiple recipients. Shared medium implementations of LAN 211 such as Ethernet and token ring LANs provide multicast capability inherently. In a switched network, the network switch can be configured to forward a packet from its sender to multiple recipients on the network.

The multicasting of network packets occurs at a low level of the network protocol. In an implementation where LAN 211 is a TCP/IP compliant Ethernet network, for example, the multicasting of packets may occur at the media access control (MAC) level. More generally, the multicasting is accomplished at the data link layer (layer 2) in the 7-layer network reference model circulated by the Open Systems Interconnect (OSI) working group of the International Standards Organization (ISO). It will be appreciated by those knowledgeable in the field of networked computing that message delivery reliability is not typically addressed at this level. An invention that employs low level multicasting must insure, therefore, that the network is sufficiently robust to continue operating in the event that a multicast message does not ultimately reach one or more of its intended targets.

Network 200 further includes at least one client 202 connected to a server 210 in server network 206. Client 202 typically includes a client application program such as a web browser executing on a client device such as a desktop or laptop personal computer, a network (diskless) computer or workstation, an Internet enabled personal data administrator (PDA) or telephone, or any other suitable network enabled device. Regardless of its specific implementation, client 202 is configured to generate, format, and send information requests to server network 206.

In one configuration, client 202 is connected to server network 206 via a wide area network (WAN) 201. WAN 201 is typically comprised of multiple switches, routers, gateways, and the like and may include one or more sub-networks similar to server network 206. In an embodiment where WAN 201 represents the Internet, devices on network 201 and the network packets that they transmit are compliant with the Transmission Communication Protocol/Internet Protocol (TCP/IP) suite of protocols described in detail in IETF RFC's 791 and 793. In another embodiment, client 202 may reside on the LAN 211 of which the server 210 and NAS device 211 are a part. LAN 211 is typically a TCP/IP network itself. The use of a common reference numeral to refer to the client connected via the WAN and the client connected directly to the server network is intended to convey that, except for their locations, the two clients 202 may be substantially the same in form and function.

In the depicted embodiment, a gateway 208 connects server network 206 to WAN 201. As indicated previously, server network 206 employs networked storage in the form of one or more NAS devices 212. Each NAS device 212 is connected to LAN 211 in the same manner as the server device(s) 210. In an Ethernet embodiment of LAN 211, each server network device includes a suitable Ethernet network interface (not explicitly depicted), each with its own MAC address.

Portions of the present invention may be implemented as a set of computer executable instructions (software) stored on or contained in a computer readable medium. The computer readable medium may comprise a volatile medium such as the system memory (DRAM) or cache memory (SRAM) of server 210 or NAS device 212 or a non-volatile medium such as a floppy diskette, hard disk, flash memory card, ROM, CD ROM, DVD, magnetic tape, or another suitable medium.

Figure 3:
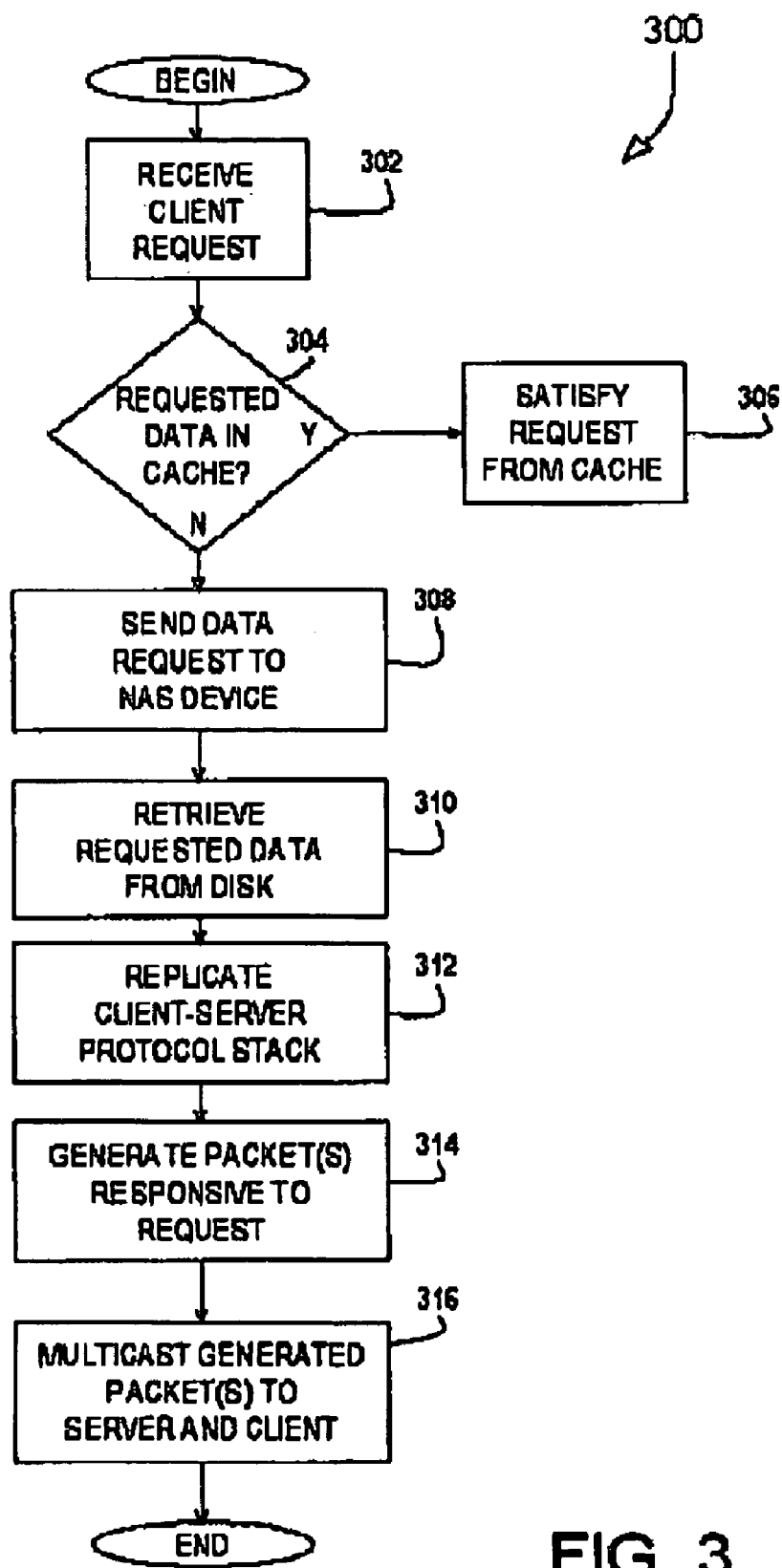
FIG 3 is a flow diagram of a method of handling client request in a NAS-based server network according to one embodiment of the invention.

Referring to FIG. 3, a flow diagram illustrating a method 300 of handling client requests in a data processing network, such as the data processing network depicted in FIG. 2, according to one embodiment of the invention is presented. Initially a client request for information such as a file is received (block 302) by a network server 210 on server network 206. The client request may be received from a client 202 connected to server network 206 through an intervening WAN 201 such as the Internet and a gateway 208 that connects server network 206. Alternatively, the client request may originate with a client 202 connected to LAN 211.

The client request typically opens a client-server connection according to the protocol employed by network 200. In a TCP/IP compliant network, the client request opens a TCP connection with server 210. The client request may specifically target server 210 or the request may be routed to a particular server 210 by a switch or other arbitrating device in a network cluster configuration.

Upon receiving the request for information, server 210 identifies the information requested and determines (block 304) whether a current copy of the requested information is in the server's cache (non-volatile memory). If the requested data is current in the server's cache, server 210 satisfies (block 306) the request in the conventional manner from the data in its cache.

If server 210 determines that the data is not in its cache (and is not in any non-volatile or disk storage that server 210 may have), it sends a request, referred to herein as a storage request or NAS request, in block 308 to retrieve the data from the NAS device 212 where the data requested by client is located. The NAS request is a network compliant request. Server 210 includes the IP address of client 202 in the NAS request and information about the network connection (the TCP connection) between client 202 and server 210. This information in the NAS request will enable NAS device 212 to send the requested data to client 202.

Upon receiving the request for information from server 210, NAS device 212 retrieves (block 310) the requested information from its disk storage. In addition, NAS device 212 uses the protocol information provided in the request from server 210 to replicate (block 312) the protocol stack that corresponds to the connection between client 202 and server 210. Using the retrieved data and the replicated protocol stack, NAS device 212 may then generate (block 314) a set of one or more network compliant packets that are responsive to the initial client request.

The packets generated by NAS device 212 include the IP address of client 202 as the target address and the IP address of server 210 as the source address. The protocol stack of the NAS generated packets would further include the client-server TCP connection information such that client 202 would receive the packets unaware of the existence of NAS device 212.

In addition, NAS device 212 would include a multicast address at a low level of the protocol stack, such as the data link layer. The multicast address used would be one of a set of multicast addresses defined statically as part of the configuration of server network 206. This low level data link layer would cause the packets generated by NAS device 212 to be forwarded (block 316) to multiple destinations, also referred as multicasting. In an embodiment where client 202 is directly connected to LAN 211, the multicast address would cause the generated packets to be sent to the client 202 and to the server 210. In an embodiment where client 202 is connected through an intervening WAN 201 and gateway 208, this multicasting would cause the generated packets to be forwarded to gateway 208 and server 210. The gateway 208 would forward these packets to client 202 in the conventional manner.

Because the data link layer in a network protocol does not address delivery reliability, there is no guarantee that the multicast recipients receive the generated packets. In contrast, the use of the client's IP address as the destination address and the client-server TCP connection protocol stack information in the generated packets does provide for the reliable transfer of the packets to client 202. Thus, the network devices will not be informed if server 210 fails to receive the generated packets from NAS device 212 using the multicast address.

If the server 210 does receive the packets transmitted by NAS device 212, the server updates its cache to include the information requested by client 202. In one embodiment, the protocol stack of server 210 modifies the destination address and port of these packets before delivering them to IP layer processing to ensure that the packets are accepted and delivered to the cache management component of server 210. If the packets do not arrive successfully, the network 200 remains fully functional, but the process of retrieving data from NAS device 212 will have to be repeated on a subsequent client request for the same information. If client 202 does not receive the generated packets from NAS device 212, client 202 will eventually request a retransmission of the data from the server. This retransmission request will be handled by server 210 and NAS device 212 in a manner similar to the manner in which server 210 and NAS device 212 responded to the original storage request. When client 202 issues a request to close the TCP connection, however, server 210 handles the request.

NAS device 212 must dedicate resources for replicating the TCP/IP protocol stack of a particular client-server connection. In one embodiment, NAS device 212 includes a time-out mechanism to reclaim the memory used for this replication. When resources dedicated for TCP/IP client-server connections exceed a pre-determined age, the resources are re-claimed.

The predetermined age limit is preferably set well greater than the time-out limit of the client-server connection itself.

It will be apparent to those skilled in the art having the benefit of this disclosure that the present invention reduces the latency of generating the response to the client using a multicast response. By preventing the response from traversing the server protocol stack twice, response performance is enhanced and traffic on LAN 211 is reduced. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of responding to a client request for information from a sever in a data processing network, comprising:
   opening a client-server connection between the client and the server;
   responsive to receiving the client request and determining that at least a portion of the information is not in a cache of the server, sending a storage request to a network attached storage device;
   responsive to the storage request, generating a packet containing at least a portion of the information; and
   sending the generated packet simultaneously to the client and to the server;
   wherein the storage request includes protocol information corresponding to the client-server connection; and
   wherein generating the packet includes using the protocol information to replicate a client-server protocol stack associated with the client-server connection in the generated packet.

2. The method of claim 1, wherein sending the generated packet comprises including a multicast address in the packet.

3. The method of claim 2, wherein the multicast address is incorporated in a data link layer of the packet.

4. The method of claim 2, wherein the generated packet is multicast to the server and to a gateway to which the client is connected via a wide area network.

5. The method of claim 2, wherein the generated packet is multicast to the server and to a client connected to the server via a local area network.

6. The method of claim 1, wherein the packet includes a source address and wherein generating the packet further includes using an IP address of the server as the source address.

7. The method of claim 1, further comprising updating the sever cache with the portion of the information contained in the generated packet responsive to the server receiving the generated packet.

8. The method of claim 1, further comprising, responsive to a subsequent client request for the information, generating a second storage request if the sever failed to receive the generated packet.

9. A data processing network, comprising:
   a sever configured to receive from a client connected to the network, via a client-server connection, a request for information;
   a network attached storage device connected to the server via a local area network;
   server code for determining if the information is available in a local cache of the server;
   server code for generating a storage request responsive to determining that the information is not locally available;
   storage device code for generating a packet containing at least a portion of the information responsive to the storage request; and
   storage device code for sending the packet simultaneously to the client and to the server;
   wherein the storage request includes protocol information corresponding to the client-server connection; and
   wherein generating the packet includes using the protocol information to replicate a protocol stack associated with the client-sever connection in the packet.

10. The data processing network of claim 9, wherein the code for generating the packet comprises including a multicast address in the packet.

11. The data processing network of claim 10, wherein the multicast address is incorporated at a data link layer of the packet.

12. The data processing network of claim 10, wherein the packet is multicast to the server and to a gateway to which to client is connected via a wide area network.

13. The data processing network of claim 10, wherein the packet is multicast to the sever and to a client connected to the server via a local area network.

14. The data processing network of claim 9, wherein generating the packet further includes using an IP address of the sever as a source address for the packet.

15. The data processing network of claim 9, further comprising sever code for updating the local cache of the server with to portion of the information in the packet responsive to the server receiving the packet.

16. The data processing network of claim 9, further comprising server code for generating a second storage request in response to a subsequent client request for the information if the server failed to receive the packet.

17. A computer program product comprising computer executable instructions, stored on a computer readable medium, for generating a packet responsive to a client request for information, the computer executable instructions comprising:
   instructions for determining, by a server, that the information is not available in a sever cache;
   instructions for sending a storage request to a network attached storage device;
   instructions for retrieving the information from a network attached storage device disk and generating a packet containing at least a portion of the information; and
   instructions for sending the packet simultaneously to the client and the server;
   wherein the storage request includes protocol information corresponding to client-server connection;
   wherein the instructions for generating the packet include instructions for using the information to replicate a client-server protocol stack in the generated packet.

18. The computer program product of claim 17, wherein the instructions for generating the packet comprises instructions for including a multicast address in the packet, wherein the multicast address identifies the client and the server.

19. The computer program product of claim 17, further comprising instructions for updating the server cache with the portion of the information contained in the packet responsive to the sever receiving the packet.

20. The computer program product of claim 17, further comprising instructions for generating a second storage request in response to a subsequent client request for the information if the server failed to receive the generated packet.

\* \* \* \* \*

UNITED STATES PATENT AND TRADEMARK OFFICE
CERTIFICATE OF CORRECTION

| | | |
|---|---|---|
| PATENT NO. | : 6,988,125 B2 | Page 1 of 4 |
| APPLICATION NO. | : 09/915435 | |
| DATED | : January 17, 2006 | |
| INVENTOR(S) | : Elmootazbellah Nabil Elnozahy and Michael David Kistler | |

It is certified that error appears in the above-identified patent and that said Letters Patent is hereby corrected as shown below:

Col. 7, line 29-48, should read

1. A method of responding to a client request for information from a ~~sever~~ server in a data processing network, comprising:

> opening a client-server connection between the client and the server;
>
> responsive to receiving the client request and determining that at least a portion of the information is not in a cache of the server, sending a storage request to a network attached storage device;
>
> response to the storage request, generating a packet containing at least a portion of the information; and
>
> sending the generated packet simultaneously to the client and to the server;
>
> wherein the storage request includes protocol information corresponding to the client-server connection; and wherein generating the packet includes using the protocol information to replicate a client-server protocol stack associated with the client-server connection in the generated packet.

Col. 7 lines 64-67 should read,

7. The method of claim 1, further comprising updating the ~~sever~~ server cache with the portion of the information contained in the generated packet responsive to the server receiving the generated packet.

Col. 8 lines 1-4 should read

8. The method of claim 1, further comprising, response to a subsequent client request for the information, generating a second storage request if the ~~sever~~ server failed to receive the generated packet.

UNITED STATES PATENT AND TRADEMARK OFFICE
CERTIFICATE OF CORRECTION

PATENT NO. : 6,988,125 B2
APPLICATION NO. : 09/915435
DATED : January 17, 2006
INVENTOR(S) : Elmootazbellah Nabil Elnozahy and Michael David Kistler It is certified that error appears in the above-identified patent and that said Letters Patent is hereby corrected as shown below:

Col. 8, lines 5-25 should read,

9. A data processing network, comprising:

a ~~sever~~ server configured to receive from a client connected to the network, via a client-server connection, a request for information;

a network attached storage device connected to the server via a local area network;

server code for determining if the information is available in a local cache of the server;

server code for generating a storage request responsive to determining that the information is not locally available;

storage device code for generating a packet containing at least a portion of the information responsive to the storage request; and storage device code for sending the packet simultaneously to the client and the server;

wherein the storage request includes protocol information corresponding to the client-server connection; and wherein generating the packet includes using the protocol information to replicate a protocol stack associated with the ~~client-server~~ client-server connection in the packet.

Col. 8 lines 32-34 should read,

12. The data processing network of claim 10, wherein the packet is multicast to the server and to a gateway to which ~~te~~ the client is connected via a wide area network.

Col. 8 lines 38-40 should read,

14. The data processing network of claim 9, wherein generating the packet further includes using an IP address of the ~~sever~~ server as a source address for the packet.

UNITED STATES PATENT AND TRADEMARK OFFICE
CERTIFICATE OF CORRECTION

| | |
|---|---|
| PATENT NO. | : 6,988,125 B2 |
| APPLICATION NO. | : 09/915435 |
| DATED | : January 17, 2006 |
| INVENTOR(S) | : Elmootazbellah Nabil Elnozahy and Michael David Kistler |

It is certified that error appears in the above-identified patent and that said Letters Patent is hereby corrected as shown below:

Col. 8, lines, 41-44 should read,

15. The data processing network of claim 11, further comprising ~~sever~~ server code for updating the local cache of the server with ~~to~~ the portion of the information in the packet responsive to the server receiving the packet.

Col. 8 lines 49-67 should read,

17. A computer program product comprising computer executable instructions, stored on a computer readable medium, for generating a packet responsive to a client request for information, the computer executable instructions comprising:

instructions for determining, by a server, that the information is not available in a ~~sever~~ server cache;

instructions for sending a storage request to a network attached storage device;

instructions for retrieving the information from a network attached storage device disk and generating a packet containing at least a portion of the information; and instructions for sending the packet simultaneously to the client and the server;

wherein the storage request includes protocol information corresponding to client-server connection;

wherein the instructions for generating the packet include instructions for using the information to replicate a client-server protocol stack in the generated packet.

UNITED STATES PATENT AND TRADEMARK OFFICE
CERTIFICATE OF CORRECTION

PATENT NO. : 6,988,125 B2
APPLICATION NO. : 09/915435
DATED : January 17, 2006
INVENTOR(S) : Elmootazbellah Nabil Elnozahy and Michael David Kistler It is certified that error appears in the above-identified patent and that said Letters Patent is hereby corrected as shown below:

Col. 9 lines 5-8 should read,

19. The computer program product of claim 17, further comprising instructions for updating the server cache with the portion of the information contained in the packet response to the ~~sever~~ sever receiving the packet.

Signed and Sealed this

Third Day of October, 2006

JON W. DUDAS
*Director of the United States Patent and Trademark Office*